United States Patent Office.

ISAIAH E. RICHARDS, OF COLUMBIA, PENNSYLVANIA.

Letters Patent No. 70,361, dated October 29, 1867.

IMPROVED COMPOSITION TO BE USED IN PUDDLING IRON.

*The Schedule referred to in these Letters Patent and making part of the same.*

TO ALL WHOM IT MAY CONCERN:

Be it known that I, ISAIAH E. RICHARDS, of Columbia, in the county of Lancaster, and State of Pennsylvania, have discovered or invented a new and useful Composition for Purifying Iron in the Puddling-Furnace; and I do hereby declare that the following is a full and exact description thereof.

The nature of my invention consists in the use of combined chemicals or agents peculiarly adapted to expel sulphur and phosphorus, and for producing the best quality of neutral or refined iron, such as requires no subsequent reheating or further treatment after it leaves the puddling-furnace.

To enable others skilled in the art to combine and use my invention I do not deem it necessary to enter upon a description of the "puddling" process or construction of the furnace, or the "boiling" process, as both are essentially the same, and the "puddling" and "boiling" processes are both in use. Each process has its advocates and recipes of chemicals, and modes of manipulation, so that I shall confine myself to a simple statement of the facts to govern the case under consideration, so that any competent workman can apply my invention successfully.

Supposing the analysis of the iron to be made, and its constituents determined in the ordinary manner, and we have a medium quality of what is called cold-short iron to be treated in the puddling-furnace, say the ordinary charge of five hundred pounds. I have at hand, pulverized and intimately mixed, a powder, combined of one and a half pound of black oxide of manganese and two to three ounces of litharge. When the metal is duly melted, I add this combined powder at intervals of one to two minutes apart, in quarter-pound doses, keeping the iron well worked and stirred, so that the entire mass is impregnated with the compound, which is found by actual experience to expel phosphorus with absolute certainty, and yield a better result or quality of iron than any other known compound. The larger the proportion of phosphorus in the iron, the more the proportion of the ingredients combined is increased; thus the compound ranges from one to three pounds of black manganese, and from two to four ounces of litharge, and it is easily determined, by a simple assay made, what the proper proportions to a certain quality of iron should be in all grades of cold-short. In like manner the treatment of red-short is determined, in order for the more effectually neutralizing or expelling the sulphur. Supposing a like charge of five hundred pounds of medium red or hot-short iron, I use a compound made of one and a half pound of oxide of manganese, as before, but, instead of the litharge, I use one-fourth of a pound of nitrate of potassa, and proceed with it in like manner as in the former case, and the result is equally satisfactory, and yields a superior neutral or refined quality of iron. The proportions of the ingredients, as in the former case, consist in the combination of from one to three pounds of black oxide of manganese, with say from two to six ounces of nitrate of potassa, accordingly as the sulphur is more or less abundant.

These compounds, upon fair trials made, have proved a saving of from eight dollars to ten dollars on each ton of finished iron, by doing away with the heretofore-employed reheating process.

I am aware that various patents have been taken out within the last four or five years for the employment of chemical agents to assist in the purification of iron in the puddling-furnace, among some of which the black oxide of manganese has been employed, but with compounds differing substantially from litharge or nitre, and are compounds that I do not claim, and deem it needless to specify them. I am not aware that any combination of the litharge or the nitrate of potassa with manganese has ever been used before, and consider either combined with manganese as novel as it has proved itself to be useful.

What I claim as my invention, and desire to secure by Letters Patent, is—

The combination of the black oxide of manganese with litharge, and also with nitrate of potassa, when combined in the manner and for the purpose substantially as herein specified.

ISAIAH E. RICHARDS.

Witnesses:
MORRIS CLARK,
J. G. HESS.